(12) United States Patent
Stoelzel

(10) Patent No.: US 10,329,746 B2
(45) Date of Patent: Jun. 25, 2019

(54) PLUMBING FITTING HAVING A HOSE CONNECTION FASTENED WITH A CLAMP

(71) Applicant: Grohe AG, Hemer (DE)

(72) Inventor: Uwe Stoelzel, Menden (DE)

(73) Assignee: Grohe AG, Hemer (DE)

( * ) Notice: Subject to any disclaimer, the term of this patent is extended or adjusted under 35 U.S.C. 154(b) by 45 days.

(21) Appl. No.: 15/053,179

(22) Filed: Feb. 25, 2016

(65) Prior Publication Data
US 2016/0244952 A1 Aug. 25, 2016

(30) Foreign Application Priority Data
Feb. 25, 2015 (DE) .......................... 10 2015 002 257

(51) Int. Cl.
*E03C 1/02* (2006.01)
*E03C 1/04* (2006.01)
*F16K 11/02* (2006.01)

(52) U.S. Cl.
CPC ............ *E03C 1/021* (2013.01); *E03C 1/0403* (2013.01); *F16K 11/02* (2013.01)

(58) Field of Classification Search
CPC ........ E03C 1/021; E03C 1/0403; F16K 11/02; Y10T 137/9464
USPC ............................................................ 4/677
See application file for complete search history.

(56) References Cited

U.S. PATENT DOCUMENTS

| | | | | |
|---|---|---|---|---|
| 6,757,921 | B2* | 7/2004 | Esche | E03C 1/04 137/625.4 |
| 8,631,816 | B2* | 1/2014 | Hsu | E03C 1/04 137/315.12 |
| 9,334,634 | B2* | 5/2016 | Bares | E03C 1/0403 |
| 2008/0163933 | A1* | 7/2008 | Ortega | E03C 1/0403 137/315.12 |
| 2008/0276367 | A1* | 11/2008 | Bares | E03C 1/04 4/677 |
| 2009/0189108 | A1* | 7/2009 | Ritter | E03C 1/0403 251/304 |
| 2009/0242058 | A1* | 10/2009 | Hansen | E03C 1/0403 137/801 |

(Continued)

FOREIGN PATENT DOCUMENTS

| | | |
|---|---|---|
| AT | 405 968 B | 1/2000 |
| DE | 33 32 773 A1 | 4/1985 |

(Continued)

*Primary Examiner* — Marina A Tietjen
*Assistant Examiner* — Frederick D Soski
(74) *Attorney, Agent, or Firm* — Muncy, Geissler, Olds & Lowe, P.C.

(57) ABSTRACT

A plumbing fitting including a fitting housing which has a mixing valve for mixing a cold water and a hot water to form a mixed water having a desired mixed water temperature, a cold water hose for the cold water and a hot water hose for the hot water opening into a plastic insert so that the cold water and the hot water is fed to the mixing valve via the plastic insert, the cold water and the hot water being able to be fed back to the plastic insert as mixed water after mixing and being able to be fed to an outlet of the plumbing fitting via a mixed water hose inserted into the plastic insert, the cold water hose, the hot water hose or the mixed water hose being fastened to the plastic insert via a clamp inserted into the front side of the plastic insert.

5 Claims, 2 Drawing Sheets

(56) References Cited

U.S. PATENT DOCUMENTS

| | | | | |
|---|---|---|---|---|
| 2012/0018020 A1* | 1/2012 | Moore | ............... | E03C 1/0403 |
| | | | | 137/798 |
| 2014/0015244 A1* | 1/2014 | Kronenbitter | ........... | F16L 41/02 |
| | | | | 285/125.1 |
| 2014/0083539 A1* | 3/2014 | Ho | ..................... | E03C 1/0401 |
| | | | | 137/625.4 |
| 2015/0198259 A1* | 7/2015 | Lin | ..................... | F16K 19/006 |
| | | | | 137/603 |

FOREIGN PATENT DOCUMENTS

| | | |
|---|---|---|
| DE | 44 15 797 A1 | 11/1995 |
| DE | 10 2013 003 926 A1 | 9/2014 |
| EP | 1 956 151 A2 | 8/2008 |
| WO | WO 2008/120252 A1 | 10/2008 |
| WO | WO 2011155904 A1 * 12/2011 ............... E03C 1/04 |

* cited by examiner

PLUMBING FITTING HAVING A HOSE CONNECTION FASTENED WITH A CLAMP

This nonprovisional application claims priority under 35 U.S.C. § 119(a) to German Patent Application No. 10 2015 002 257.1, which was filed in Germany on Feb. 25, 2015, and which is herein incorporated by reference.

BACKGROUND OF THE INVENTION

Field of the Invention

The present invention relates to a plumbing fitting which is regularly used in connection with washbasins, sinks, showers or bathtubs. Plumbing fittings of this type are used, in particular, to provide a mixed water having a desired mixed water temperature according to the requirements.

Description of the Background Art

Plumbing fittings are known from the prior art, in which drinking water is guided through a brass insert in a fitting housing and consequently comes into contact with brass. Brass inserts of this type are regularly built into a fitting housing made of a high-pressure zinc die casting and must therefore be nickel-plated or chromium-plated for the purpose of providing galvanic isolation. However, nickel platings in particular are problematic in some countries because they may result in impermissible nickel contamination of the drinking water. In plumbing fittings of this type, moreover, feed hoses and a mixed water outlet are screwed and glued into the brass housing as a soldered assembly. When replacing a feed hose, the plumbing fitting must therefore be laboriously disassembled.

SUMMARY OF THE INVENTION

It is therefore an object of the invention to at least partially solve the problems described with respect to the prior art and, in particular, to specify a plumbing fitting, with the aid of which a nickel contamination of the drinking water is avoidable and which is easy to maintain.

The plumbing fitting can be used, in particular, in connection with washbasins, sinks, showers and bathtubs. The plumbing fitting includes a fitting housing which has a mixing valve for mixing a cold water and a hot water to form a mixed water having a desired mixed water temperature. The plumbing fitting is made at least partially of plastic and/or metal, for example brass. The plumbing fitting is furthermore able to be fastened, in particular, to a mounting opening of the washbasin, sink, shower or bathtub. The mixing valve is actuatable, in particular, via an actuating grip of the plumbing fitting. The mixing valve may be, in particular, opened, closed and/or a desired mixed-water temperature set with the aid of the actuating grip. The mixing valve is, in particular, a mixer cartridge, for example a so-called single-lever mixer cartridge.

The plumbing fitting is supplied with cold water via a cold water hose and with hot water via a hot water hose. The cold water has, in particular, a cold water temperature of 0° C. to 40° C., and/or the hot water has a hot water temperature of 40° C. to 80° C. The cold water hose and the hot water hose empty into a plastic insert. The plastic insert is, in particular, an at least partially cylindrical body. The plastic insert furthermore has flow channels for the cold water, the hot water and the mixed water mixed by the mixing valve. The cold water and the hot water may be supplied via the plastic insert to the mixing valve, in which the cold water and the hot water are mixable to form the mixed water. The mixed water may then be fed back to the plastic insert and subsequently fed to an outlet of the plumbing fitting via a mixed water hose inserted into the plastic insert.

The cold water hose, hot water hose and/or mixed water hose is/are fastened to the plastic inserted with the aid of a clamp inserted into the front side of the plastic insert. While a separate clamp may be provided for one or for all stated hoses, it is also possible for each individual hose or multiple hoses to be fixed with the aid of one single clamp. Inserted "into the front side" is understood to mean, in particular, an arrangement of the clamps in a front surface (i.e., not (only) on a circumference) of the plastic insert. A front surface of the plastic insert, in turn, is understood to be, in particular, a surface of the plastic insert oriented in a longitudinal direction of the plastic insert. In particular, the clamp is also insertable into the front surface of the plastic insert which is situated the closest to the mixing valve after the plumbing fitting is mounted The cold water hose, hot water hose and/or the mixed water hose is/are made, in particular, of a material which is not harmful to heath, for example plastic. This ensures that the drinking water does not come into contact with materials which are harmful to health, for example brass. During the maintenance of the plumbing fitting, for example in the case of a defective cold water hose, hot water hose and/or mixed water hose, the entire plumbing fitting does not have to be disassembled. Instead, the mixing valve may be removed from the fitting housing, whereby the cold water hose, hot water hose and/or mixed water hose may be replaced after loosening the clamp. A reduction in the number of variants may furthermore be achieved, because it is not necessary to take into account the use of different brass materials. A galvanic corrosion is also avoidable, due to the use of the plastic insert.

It is also advantageous if the clamp terminates flush with a front surface of the plastic insert. "Flush" can be understood to mean, in particular, that the clamp inserted into the front surface fills a (correspondingly formed) recess for the clamp in the front surface in such a way that the clamp, together with the front surface, forms an essentially planar surface of the plastic insert.

The mixing valve can be fastened on a front surface of the plastic insert, so that the clamp is secured against detachment from the plastic insert. This means, in particular, that the mixing valve is fastened on the front surface of the plastic insert in such a way that the clamp rests against the mixing valve.

The cold water hose, the hot water hose or the mixed water hose can have a collar on one insertion end, via which the cold water hose, the hot water hose or the mixed water hose is fastenable to the plastic insert in a form-fitting manner with the clamp. The insertion end is, in particular, an area of the cold water hose, the hot water hose and/or the mixed water hose, with the aid of which the cold water hose, the hot water hose and/or the mixed water hose is/are insertable into the plastic insert. In particular, a circumferential collar, which acts as a contact surface, holding surface, latch, etc. for the clamp, is formed on the insertion end.

The clamp can be insertable into the plastic insert orthogonally to a longitudinal axis of the cold water hose, the hot water hose or the mixed water hose.

The clamp can includes a base section, in particular for positioning near the front surface of the plastic insert, and if it includes at least one projection extending away from the base section, in particular for the form-fitting engagement with the cold water hose, the hot water hose and/or the mixed water hose. The base section may be designed to have a thicker-walled cross section than the protection. The projection may be designed in the manner of a bolt, web, etc., which is held in place, stabilized by the base section.

The clamp can have an L-shaped or T-shaped cross section, in particular if it is designed as a base section with a projection.

The plastic insert can have a U-shaped recess for the clamp. The U-shaped recess is easy to manufacture, supports the mounting of the clamp and may be used, in particular, to embed the base section described above.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
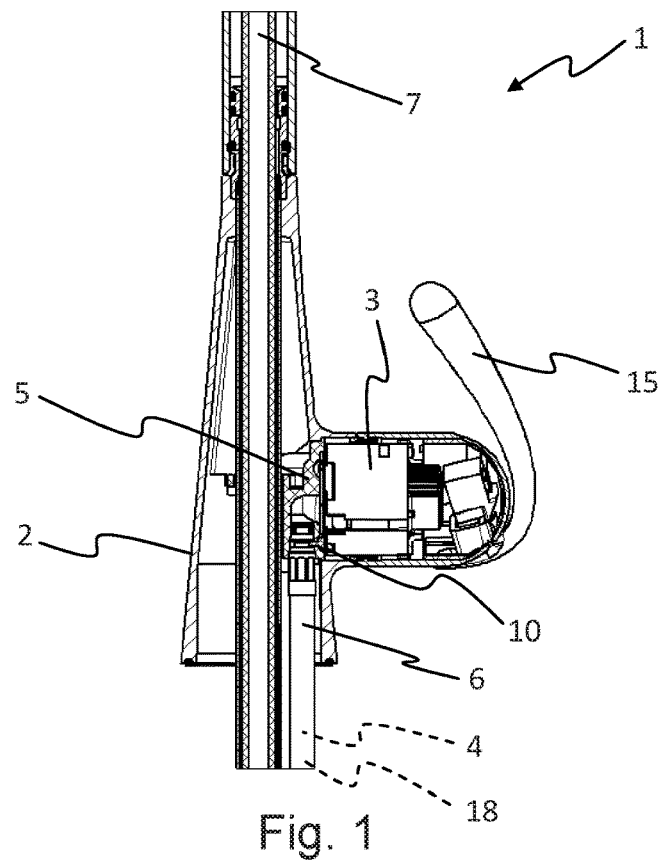
FIG. 1 shows a longitudinal sectional view of a plumbing fitting.

FIG. 1 shows a plumbing fitting 1, which includes a fitting housing 2 which has a mixing valve 3 for mixing a cold water and a hot water to form a mixed water having a desired mixed water temperature. Plumbing fitting 1 is supplied with cold water via a cold water hose 4, which is covered by illustrated mixed water hose 6, and with hot water via a hot water hose 18, which is also covered. FIG. 3, which is a schematic of a back view of a plastic insert 5 of FIG. 2 (discussed below) depicts the cold water hose 4 and the hot water hose 18. Cold water hose 4 and hot water hose 18 open into the plastic insert 5. The cold water and the hot water may be supplied via plastic insert 5 to mixing valve 3, which is disposed on a front surface 10 of plastic insert 5. Mixing valve 3 is actuatable via an actuating lever 15 of plumbing fitting 1. The mixed water mixed by mixing valve 3 may be fed back to plastic insert 5 and is conductible to an outlet 7 of plumbing fitting 1 via a mixed water hose 6, which is inserted into plastic insert 5

Figure 2:
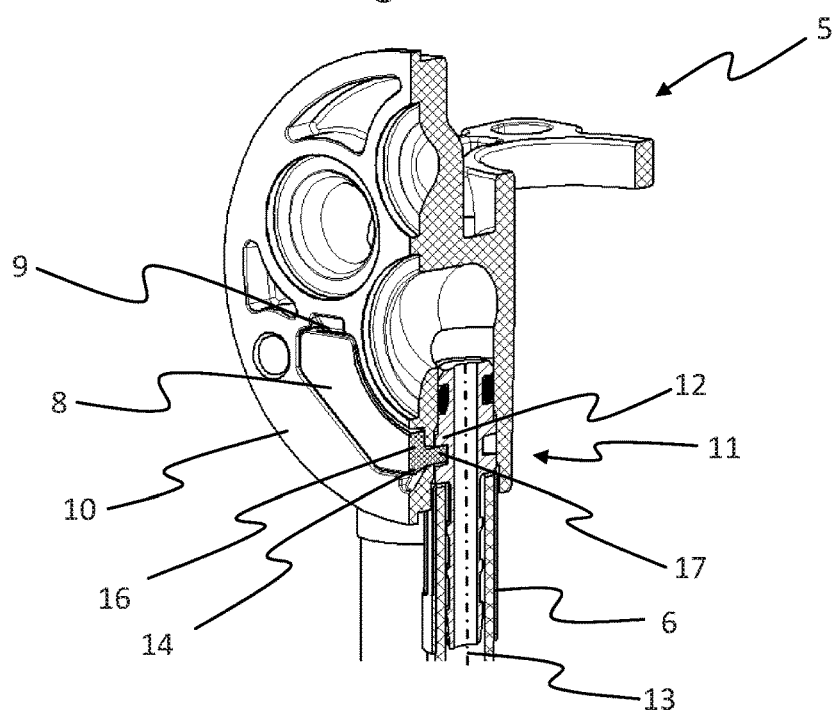
FIG. 2 show a perspective representation of a plastic insert of the plumbing fitting.
Figure 3:
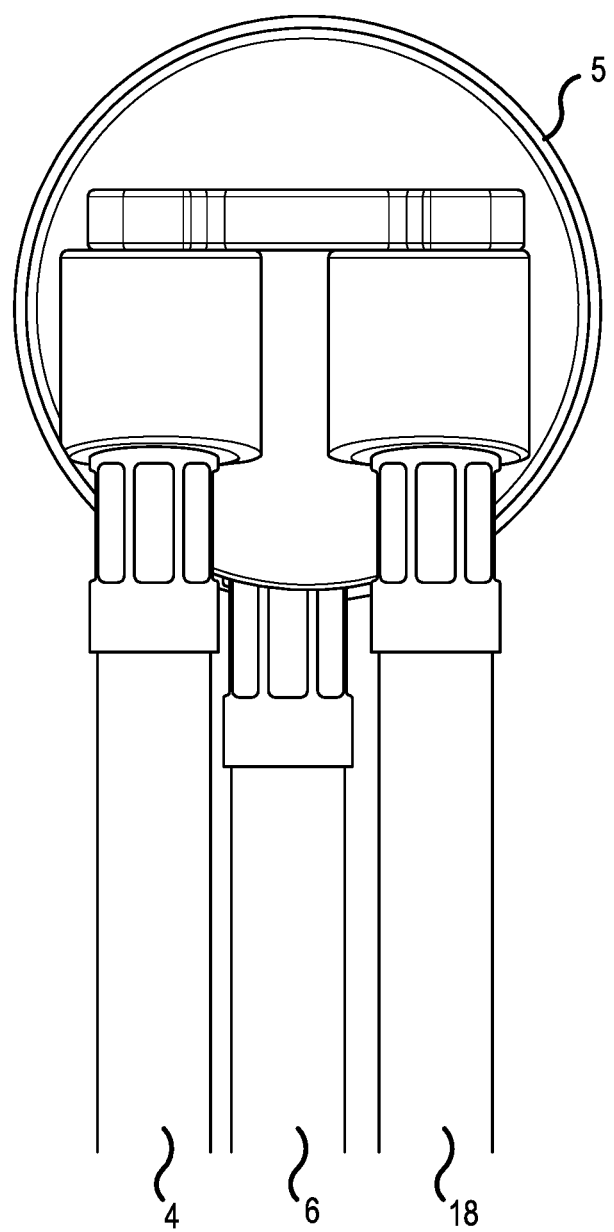
FIG. 3 shows a schematic back view of the plastic insert of FIG. 2.

FIG. 2 shows a perspective partial sectional view of plastic insert 5 of plumbing fitting 1 illustrated in FIG. 1. In particular, mixed water hose 6, which is inserted into plastic insert 5 by one insertion end 11, is apparent here. Mixed water hose 6 includes a circumferential collar 12 on insertion end 11, via which mixed water hose 6 is fastenable to plastic insert 5 in a form-fitting manner with the aid of a clamp 8. Clamp 8 is inserted into a U-shaped recess 9 in front surface 10 of plastic insert 5, only half of which is illustrated here, and terminates flush with front surface 10.

Clamp 8 is furthermore inserted into plastic insert 5 orthogonally to a longitudinal axis 13 of mixed water hose 6 and has a cross section 14 which is characterized by a base section 16 and a projection 17.

Due to the present invention, a contamination of a drinking water by nickel is avoidable and a maintenance of a plumbing fitting is also possible with little effort.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A plumbing fitting comprising:
a fitting housing that has a mixing valve for mixing cold water and hot water to form a mixed water having a desired mixed water temperature; and
a cold water hose for the cold water and a hot water hose for the hot water opening into a plastic insert so that the cold water and the hot water is fed to the mixing valve via the plastic insert, the cold water and the hot water being adapted to be fed back to the plastic insert as mixed water after mixing and being adapted to be fed to an outlet of the plumbing fitting via a mixed water hose inserted into the plastic insert,
wherein the mixed water hose is fastened to the plastic insert via a clamp inserted into a front surface of the plastic insert,
wherein the front surface of the plastic insert is a planar surface to which the mixing valve is directly connected, the mixing valve being connected to the front surface of the plastic insert after insertion of the clamp into the front surface, such that in a fully assembled state, the mixing valve covers the clamp so that the clamp directly contacts the mixing valve and is secured against detachment from the plastic insert,
wherein the plastic insert has a recess for the clamp, the recess being provided at the front, planar surface of the plastic insert,
wherein an outer periphery of the recess provided at the front, planar surface is U-shaped,
wherein the front, planar surface of the plastic insert includes a flow channel opening for the cold water, a flow channel opening for the hot water and a flow channel opening for the mixed water,
wherein the clamp has a U-shaped planar surface, and
wherein the front, planar surface of the plastic insert and the U-shaped planar surface of the clamp are co-planar.

2. The plumbing fitting according to claim 1, wherein the clamp terminates flush with the front surface of the plastic insert.

3. The plumbing fitting according to claim 1, wherein the mixed water hose has a collar on an insertion end, via which the mixed water hose is fastenable to the plastic insert in a form-fitting manner via the clamp.

4. The plumbing fitting according to claim 1, wherein the clamp is insertable into the plastic insert orthogonally to a longitudinal axis of the mixed water hose.

5. The plumbing fitting according to claim 1, wherein the clamp includes a base section and at least one projection extending away from the base section.

* * * * *